United States Patent [19]

Achreiner

[11] Patent Number: 5,443,676
[45] Date of Patent: Aug. 22, 1995

[54] METHOD AND APPARATUS FOR ETCHING ROUND TEMPLATES

[75] Inventor: Jakob Achreiner, Hopfgarten, Austria

[73] Assignee: Schblonentechnik Kufstein Ges. m.b.H., Germany

[21] Appl. No.: 268,574

[22] Filed: Jul. 6, 1994

Related U.S. Application Data

[62] Division of Ser. No. 124,455, Sep. 22, 1993, Pat. No. 5,378,509.

[30] Foreign Application Priority Data

Sep. 28, 1992 [EP] European Pat. Off. ............ 92116579

[51] Int. Cl.$^6$ .................................................. B44C 1/22
[52] U.S. Cl. .................................................. 156/345
[58] Field of Search .................................................. 156/345

[56] References Cited

U.S. PATENT DOCUMENTS

| 4,389,275 | 6/1983 | Ballato ........................ 156/345 |
| 4,454,001 | 6/1984 | Sternheim et al. ............ 156/345 |
| 4,478,677 | 10/1984 | Chen et al. .................. 156/345 |
| 4,624,736 | 11/1986 | Gee et al. .................... 156/345 |

FOREIGN PATENT DOCUMENTS

| 175561 | 3/1986 | European Pat. Off. ........... 156/345 |
| 128528 | 6/1987 | Japan .......................... 156/345 |
| 289253 | 11/1989 | Japan .......................... 156/345 |

Primary Examiner—Hoa Van Le
Attorney, Agent, or Firm—Laubscher & Laubscher

[57] ABSTRACT

By means of a laser beam, a lacquer layer lying on the surface of a hollow, cylindrical, rotating metal screen is eroded in predetermined pattern regions. The erosion of the lacquer layer within the pattern region takes place with the laser beam continuously energized. The laser beam is deenergized at the end of each respective pattern region within a time interval of 12 $\mu s$ to 30 $\mu s$. Radiation reflected back at the metal screen into the laser beam path is coupled out from the laser beam path, in order not to delay the deenergization of the laser beam. As a result, patterns with particularly sharp edge structures may be generated.

6 Claims, 3 Drawing Sheets

METHOD AND APPARATUS FOR ETCHING ROUND TEMPLATES

This application is a division of application Ser. No. 08/124,455, filed Sep. 22, 1993, now U.S. Pat. No. 5,378,509.

BACKGROUND OF THE INVENTION

The present invention relates to a method and apparatus for etching round templates.

In the manufacture of a round template, a metallic hollow cylinder is thinly coated on its outer surface with an organic lacquer and has a very thin wall. The metallic hollow cylinder possesses a plurality of small through-openings, which are situated very closely adjacent to one another and which are sealed or closed by the organic lacquer. To generate a pattern image, the metallic hollow cylinder, which is in the form of a metallic screen, is clamped at both ends and rotated in a device which is similar to a lathe. A laser beam is guided parallel to the longitudinal axis of the hollow cylinder and deflected by a deflecting mirror which is movable parallel to the axis, in such a manner that the beam then extends perpendicular to the surface of the hollow cylinder. The laser beam is focused by a lens arrangement in such a manner that a focal point of very small diameter lies precisely on the surface of the cylinder. When the laser beam is energized, the organic lacquer is eroded from the surface of the hollow cylinder by vaporization, in a manner corresponding to the predetermined pattern image. The laser beam is guided in the axial direction of the hollow cylinder and the hollow cylinder is rotated. In the eroded lacquer regions, which can also be designated as pattern regions, the through-openings in the hollow cylinder are accordingly free, so that viscous agents, for example a printing paste, may be pressed through them are a subsequent stage.

To generate the laser beam, a gas power laser is usually employed, which in general contains carbon dioxide as the laser medium. When such a gas laser is deenergized, depending upon the length of the deenergization time, differing energy progressions of the laser radiation are obtained. In this case, the length of the deenergization time is dependent essentially upon the laser gas composition. In the event of an incorrect choice of the deenergization time, there is a considerable risk that pattern images may arise with edge structures not sharp enough to comply with current requirements.

On the other hand, the energy of the laser radiation which is expended for the erosion of the lacquer layer is invariably chosen to be slightly greater than would correspond to the vaporization energy for the lacquer. In this case, the excess radiation energy is reflected by the metallic screen surface lying below the lacquer. This leads to a situation in which the gas laser can no longer be reliably switched.

In most cases, a carbon dioxides laser of appropriate power is excited by means of electrodynamic steady or alternating fields. In the case of a direct-current excitation, the electrodes are located in the gas stream and the emission of a laser beam is compelled by energization or deenergization of a direct voltage of several kilovolts. In the case of an alternating field excitation, the electrodes are disposed parallel to the gas stream outside the glass tubes bounding the latter and the field extends perpendicular to the tube axis through the glass tube wall, and specifically with a frequency of a few hundred kHz up to 50 MHz.

A precondition for the laser process is that the laser gas can store energy at a metastable level. However, this results in the disadvantage that in the laser gas, latent energy remains stored even after deenergization of the electrical excitation, so that residual radiation reflected from the surface of the metal cylinder can cause a discharge of the metastable energy level even after the deenergization of the electrical excitation. Non-uniform deenergization the laser beam results, so that very imprecise etch edges are obtained.

However, even during the electrical energization period of the laser, i.e. during the time interval of the electrical excitation, the aforementioned back reflections lead to undesirably high and very short pulses of the laser radiation, which in certain circumstances can cause a destruction of the surface of the metal screen. Furthermore, pulsating changes in the width of the etch line generated by the focused laser beam are obtained. Since these phenomena not only cause a loss of quality of the etching, but also involve a loss of strength of the base substrate, it is preferable to prevent them.

SUMMARY OF THE INVENTION

The object of the invention is to develop further the process for etching round templates in such a manner that, in terms of quality, improved pattern images, especially with sharper etch edges, are obtained. Another object of the invention is to provide a suitable device for carrying out the process.

A process for etching round templates using a laser beam by which a lacquer layer lying on the surface of a hollow cylindrical, rotating metal screen is eroded in predetermined pattern regions, is distinguished in that
- the erosion of the lacquer layer takes place within the pattern regions with the laser beam continuously energized,
- the laser beam is deenergized at the end of each respective pattern region within a time interval of 12 $\mu$s to 30 $\mu$s, and
- radiation reflected back at the metal screen into the laser beam path is coupled out of the laser beam path.

With this process, pattern images with a very sharp edge structure or very precise etch edges are formed if surface velocities of the rotating metal screen are selected which are within the range $\geq 2$ m/s, the maximum being 12 to 13 m/s. Thus, as a result of the laser beam being energized continuously within a pattern region, perfect energy stabilization is achieved, so that upon the deenergization of the laser beam at the boundary of the pattern structure, the energy at all times falls off from its maximum value. This leads to a more abrupt energy transition and thus to a sharper edge structure. The short deenergization times within the range from 12 $\mu$s to 30 $\mu$s on the other hand ensure an extremely rapid falling off of the energy of the laser beam, whereby with the selected rotational velocities of the hollow cylindrical metal screen, no structural blurs having disadvantageous effects can occur. As a result of decoupling the radiation reflected back at the metal cylinder, a reliable deenergization of the laser also is possible which contributes to the improvement of the etch edges.

The time interval for the deenergization of the laser beam is preset in an appropriate manner, and specifically by alteration of the laser gas composition. In the case of a carbon dioxide laser, this concerns the gas components $CO_2$, $N_2$ and He. If they are, for example, selected to be 14%, 18%, and 68%, respectively, then a relatively slow gas mixture is present, with which the deenergization time interval is within the range from 25 to 30 $\mu s$ at 100% laser power. On the other hand, a faster gas mixture at 65% laser power and with a composition of 16% $CO_2$, 4% $N_2$ and 80% He, exhibits a deenergization time interval within the range from 12 $\mu s$ to 15 $\mu s$.

According to a very advantageous embodiment of the invention, the laser beam can be deenergized before reaching the end of the respective pattern region, by a period of time which is dependent upon its deenergization time interval. By this means, the etch edge may be to some extent retraced. This is advantageous, especially in the case of relatively large energization time intervals, in order to keep the spacing between successive pattern regions in conformity with the predetermined pattern image, since in general the energization time interval of the gas laser corresponds to only a fraction of the deenergization time interval and otherwise the successive pattern regions would lie closer to one another. By this means also, the quality of the pattern image may be considerably improved.

According to a further embodiment of the invention, the laser beam, which may preferably exhibit a power of approximately 1 kW, is in the first instance linearly polarized for decoupling the radiation reflected back, whereafter it passes through a further polarizing filter, before it is split up into, for example, two equally large beam components, which are perpendicular to one another and which are phase-shifted relative to one another by 90 degrees before they impinge upon the lacquer layer. Preferably, in the etching process according to the invention, use is made of a laser arrangement in which the laser beam leaves the laser already linearly polarized and enters a further beam guidance in this condition. In the beam guidance, a polarizer is also provided which transmits to the processing location or deflects to that location the linearly polarized radiation which is directed to that location, depending upon the construction of the polarizer. Since the radiation reflected back at the processing location is to be prevented by this polarizer from again entering the laser resonator, a phase shifting system is provided in the subsequent progression of the laser beam, which shifts in phase relationship two approximately equal large and mutually perpendicular components of the linearly polarized laser radiation upon each passage by approximately one quarter of a wavelength relative to one another. Furthermore, the polarizer is disposed in relation to the beam direction and the position of the plane of polarization of the radiation directed towards the processing location and emerging from the laser, in such a spatial position that this radiation passes to the processing location as far as possible without attenuation. This last condition is applicable to all following components of the device, i.e. also to those of the phase shifting unit, which participate in the onward transmission or the transport of the laser radiation. These requirements can be satisfied particularly well where components are used which are built up from dielectric thin layers. Such components can be specifically manufactured both for the polarization and for the transmission and reflection, and have the advantage that excellent transmittances and reflectances are achieved in circumstances in which they are disposed in the correct spatial position with respect to the direction of incidence of the radiation and to the direction of polarization.

The phase shifting system present behind the polarizer comprises a plurality of deflecting mirrors, which exhibit a differing layer structure. The first deflecting mirror of the system is disposed so that the plane of incidence formed from the beam direction and the direction of the normal to the reflecting surface includes, with the plane of polarization of the laser beam, a finite azimuth angle which preferably amounts to 45 degrees. Thus, the direction of polarization of the laser beam is split up into a light wave (p-wave) parallel to the plane of incidence and a light wave (s-wave) perpendicular thereto. As a result of differing thicknesses of the individual thin layers, differing phase shifts of the p-wave and of the s-wave are achieved upon reflection at the deflecting mirrors. In an exemplary embodiment, a quarter lambda mirror is combined with three zero-degree mirrors. Upon a reflection at the quarter lambda mirror, the p-wave is shifted relative to the s-wave in terms of time by a phase angle of 90 degrees, i.e. by a quarter wavelength. A reflection at a zero-degree mirror takes place in such a manner that absolutely no phase shift between p-wave and s-wave takes place. The geometric or structural sequence in which the zero-degree mirrors and the quarter lambda mirror are disposed is of no significance. In place of a quarter lambda mirror, it would also be possible to provide two eighth lambda mirrors, which then cause in each instance a relative phase shift of the aforementioned wave trains by one eighth of the wavelength, whereby a total shift of again one quarter of a wavelength is achieved.

The phase shifting device generates from the linearly polarized laser beam a circularly or possibly an elliptically polarized laser beam. The latter is directed via further zero-degree reflectors, which can be provided in any selectable number, onto the template surface to be etched and is there focused by an optical system. A beam which is possibly reflected back perpendicularly from the metal surface passes through the phase shifting device once again. Then there takes place, in the course of a rearwardly directed pass through, the phase shifting device, a further shift of the phase relationship of the p-wave relative to the s-wave by a phase angle of 90 degrees or by a quarter wavelength. In consequence of the 180-degree phase shift now produced, the beam travelling back is again linearly polarized and its plane of polarization is rotated by 90 degrees relative to the plane of polarization of the beam travelling to the processing location. The beam with this direction of polarization is now no longer passed back from the polarizer to the laser, but is deflected by the latter and is thus prevented from entering the laser resonator.

According to a further embodiment of the invention, the phase shifting device or the device rotating the plane of oscillation may exhibit in addition, one behind the other in the beam path, a plane dielectric plate set at the Brewster angle, of high refractive index, as well as a birefringent small crystal plate.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
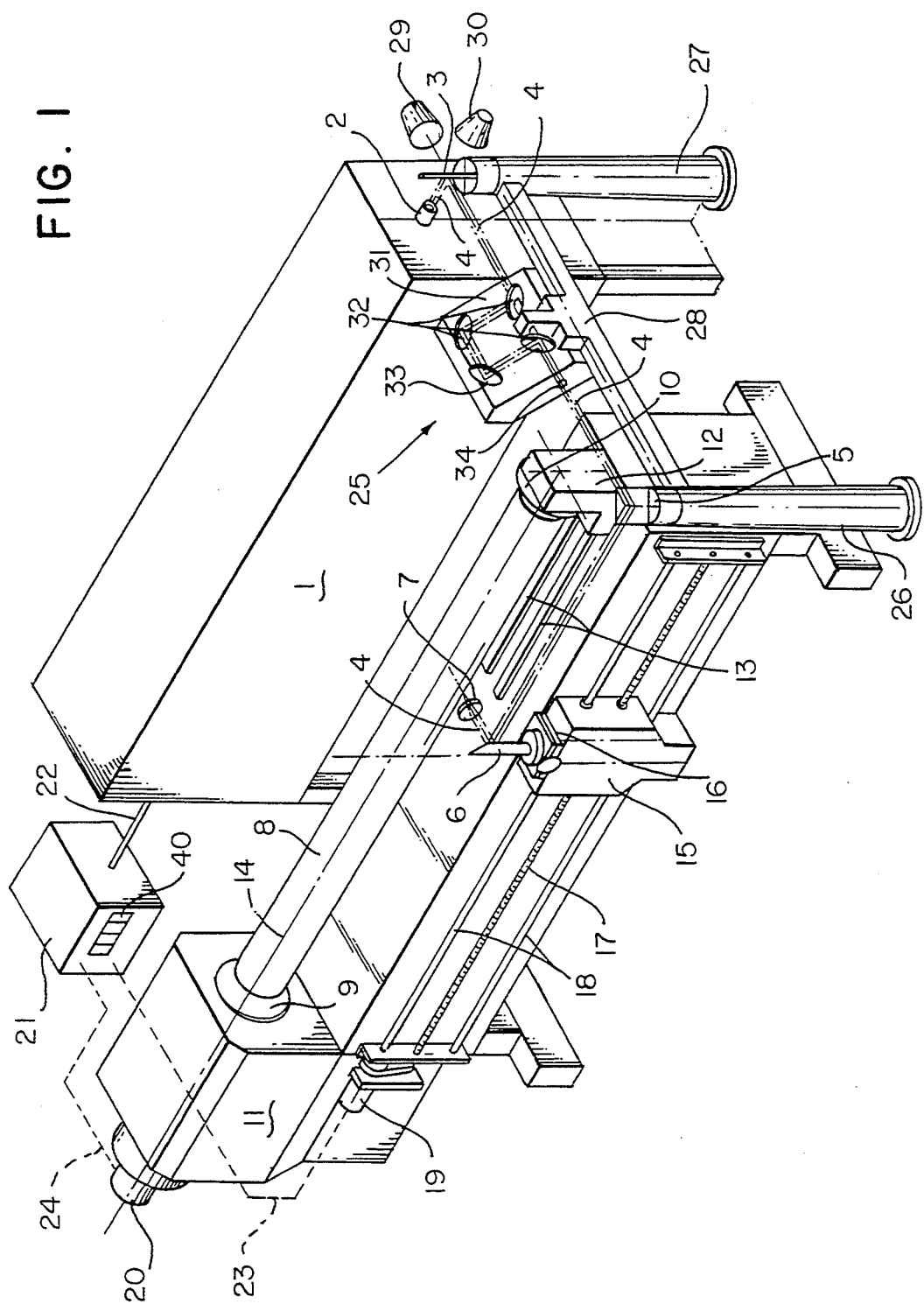
FIG. 1 shows a perspective view of a laser etching device according to the invention.

FIG. 1 shows a device according to the invention with a power laser 1 which in the present case is a $CO_2$ laser and which emits via an exit opening 2 a laser beam 4 which impinges upon a first deflecting mirror 3 and which is linearly polarized in the vertical direction. By the first deflecting mirror 3, the laser beam 4 is deflected through 90 degrees and, after passing through a phase shifting device, impinges upon a second deflecting mirror 5, in order once again to be deflected through 90 degrees, so that it now travels in a direction opposite to its original direction. By means of a third deflecting mirror 6, there takes place once again a deflection of the laser beam 4 through 90 degrees, and specifically in a direction towards the power laser 1. In this case, the laser beam 4 passing to the third deflecting mirror 6 is focused by means of an optical focusing system comprising a lens 7 in such a manner that its focal point comes to lie on the outer envelope surface of a hollow cylinder 8, which is thinly coated with an organic lacquer. The hollow cylinder 8 comprises a very thin and uniformly perforated metal grid and is retained between two rotatably mounted conical stumps 9 and 10. The conical stump 9 is set into rotation in headstock 11 by a drive (not shown). The conical stump 10 is also rotatable mounted, and specifically in a tailstock 12. The tailstock 12 can be pressed on guide tracks 13 in the direction of a hollow cylinder axis 14 against the hollow cylinder 8. It also presses the hollow cylinder 8 against the conical stump 9. As a result of friction contact, the hollow cylinder 8 and the conical stump 10 are entrained by the rotary movement of the conical stump 9. Because of the extremely low frictional resistance, which the conical stump 10 running in ball bearings in the tailstock 12 has to overcome, and also because of the very constant speed of driving rotation of the conical stump 9, very low axial tensile forces between the hollow cylinder 8 and the conical stumps 9 and 10 are sufficient to drive the hollow cylinder 8 without slip and thus with the speed of rotation of the conical stump 9.

The third deflecting mirror 6 and the lens 7 are mounted on a processing table or carriage 15 which is movable in the direction of the axis 14 of the hollow cylinder 8. Stated in more precise terms, the processing table 15 carries a cross slide 16, on which the third deflecting mirror 6 and the lens 7 are disposed and by which a precise radial adjustment of the focal point generated by the lens 7 on the surface of the hollow cylinder 8 is possible. When the processing table 15 is moved by means of a spindle 17 along guide rods 18 in the direction of the axis 14 of the hollow cylinder 8, and when the hollow cylinder 8 is rotated, the focal point of the lens 7 and the laser beam 4 focused at the focal point describes a helix on the surface of the hollow cylinder 8. The drive of the spindle 17 is effected by a stepping motor 19. For the energization and deenergization of the laser beam 4 emitted by the power laser 1, and also for control of the stepping motor 19, it is necessary at any time to know the precise rotational position of the hollow cylinder 8. For this reason, a rotational position decoder 20 is connected to the shaft of the conical stump 9, which decoder emits several thousand pulses for the determination of the rotational position during one revolution of the hollow cylinder 8. With the aid of the determined rotational position of the hollow cylinder 8 and the position of the processing table 15, an electronic memory is addressed, in which a desired pattern image is previously stored. The addressed value indicates whether at the corresponding position the lacquer layer is or is not to be eroded on the hollow cylinder 8, i.e. whether an energization of the laser 1 is required or can be omitted. The electronic memory is situated in a control device 21, which is connected via lines 22, 23, and 24 to the laser 1, the stepping motor 19 and the rotational position decoder 20.

As has already been mentioned, there is situated between the first deflecting mirror 3 and the second deflecting mirror 5 a phase shifting device which bears the reference symbol 25. This phase shifting device 25 is mounted on a crossbeam 28 which connects two uprights 26 and 27. The uprights 26, 27 receive the deflecting mirrors 3 and 5, respectively. On the upright 27 there are also mounted two beam collectors 29, 30 which are described in greater detail hereinbelow. Furthermore, the phase shifting device 25 includes a housing 31 in which four further deflecting mirrors 32, 33 are disposed, and details of these will likewise be given below. At opposite sides of the housing 31 there are situated through-openings 34 for the passage of the beam.

Figure 2:
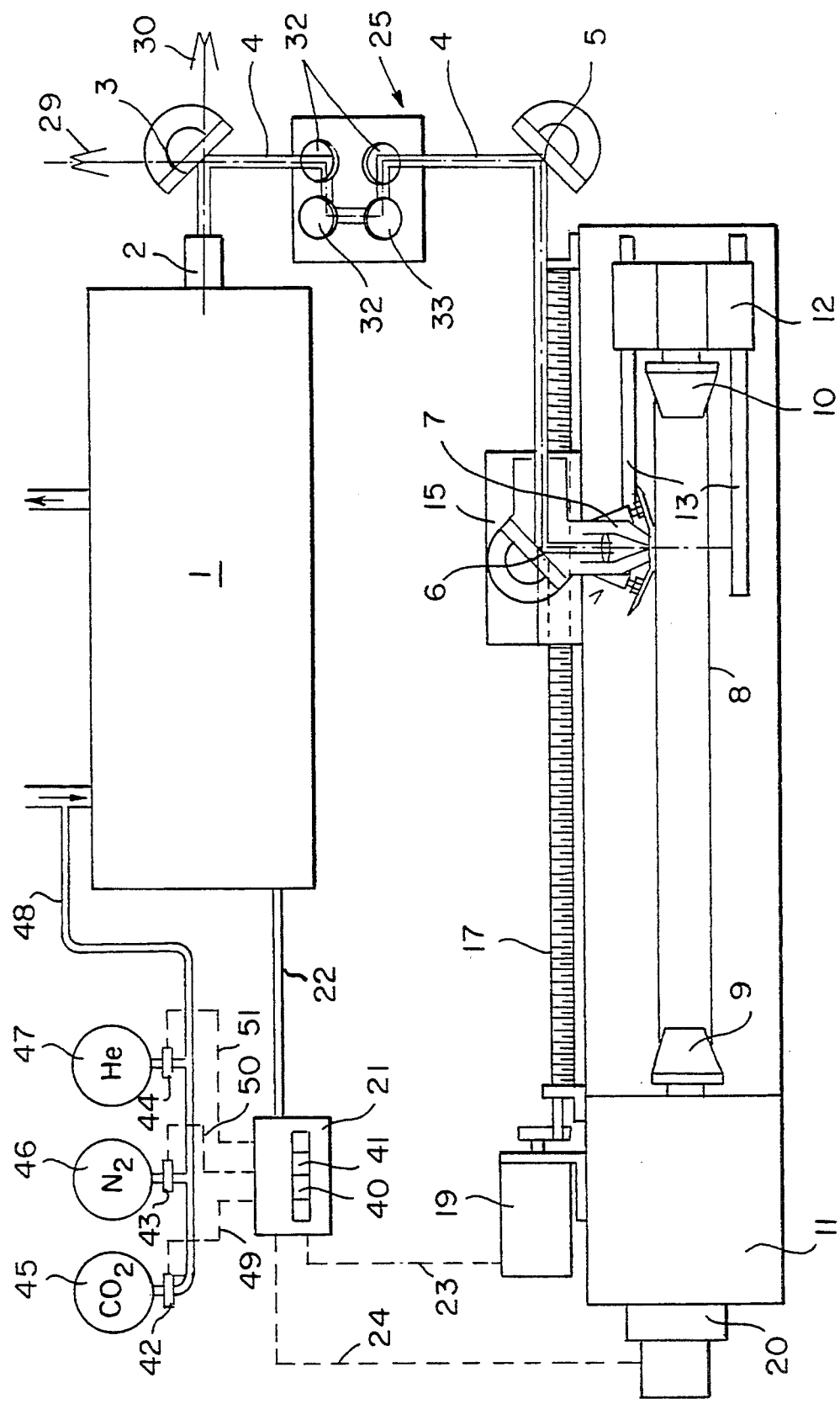
FIG. 2 shows a plan view of a device similar to FIG. 1.

FIG. 2 shows a device, similar to FIG. 1, for etching round templates, but in this case the processing table 15 is guided at that side of the hollow cylinder 8 which faces the laser 1. Elements identical with those in FIG. 1 are provided with the same reference symbols and are not described again.

According to FIG. 2, the aforementioned control device 21 exhibits a setting device 40, for example a number of suitable pushbuttons 41, in order upon appropriate actuation to preset a desired gas composition for the filling of the power laser 1, depending upon the desired deenergization time interval of the laser beam 4. Appropriate metering valves 42, 43, 44 may in this case be controlled directly as a function of the actuation of the buttons, in order to supply in each instance $CO_2$, $N_2$ and He from containers 45, 46, 47 via a line system 48 to the laser 1. To this end, the control device 21 is connected via electrical lines 49, 50, 51 to the respective metering valves 42, 43, 44.

Figure 3:
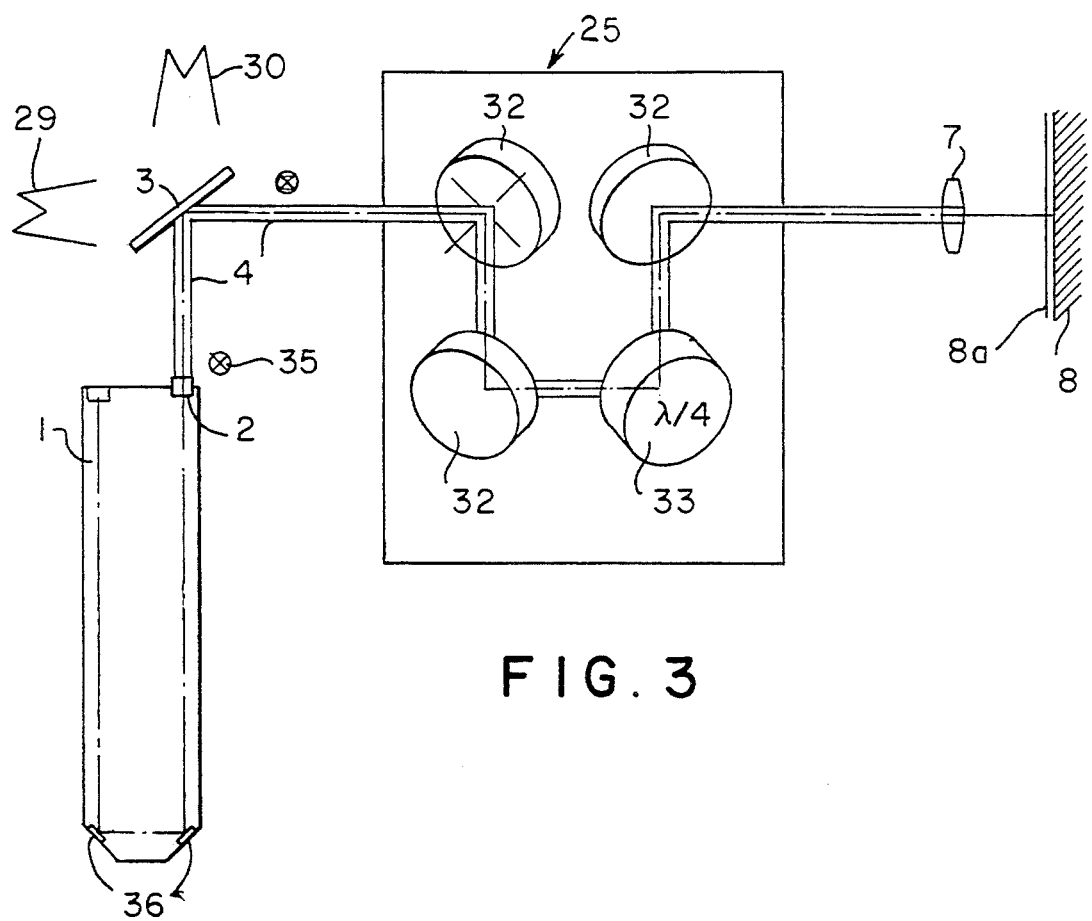
FIG. 3 shows the device with a phase shifting device according to a first exemplary embodiment.

FIG. 3 shows the principle of decoupling the laser radiation reflected back at the metal cylinder 8. In this case, the laser 1 generates the laser beam 4 which is linearly polarized in the vertical direction. In FIG. 3, the vertical direction is provided with the reference symbol 35. The polarization of the laser beam 4 is preserved in the resonator of the laser 1 by a deflecting mirror system 26. To this end, by way of example, the surfaces of these deflecting mirrors are disposed at 45 degrees to the direction of the beam. Gold has a slightly higher reflectivity for the s-wave than for the p-wave. As a result, the s-wave is preferred in the laser resonator. This is sufficient to permit the laser beam 4 to emerge at the opening 2 in a substantially vertically polarized condition. The laser beam 4 then impinges upon the deflecting mirror 3, which is designed as a thin-layer polarizer. As has just been mentioned, the laser beam 4 exhibits an essentially vertical direction of polarization and thus comprises with respect to the plane of incidence of the thin-layer polarizer 3 only an s-component, which is reflected by this polarizer to the extent of a very high percentage rate, and is hardly transmitted. Because of the possibility that a power laser may still emit an albeit small p-radiation component, a beam collector 30 is provided for safety reasons.

The thin-layer polarizer 3 comprises seven to nine dielectric layers, which are formed alternatively from material with a lower refractive index (e.g. n=1.5) and material with a high refractive index (e.g. n=2.4). The thickness of the individual layers is selected so that the effective optical path length for the waves travelling obliquely in the layers amounts to one quarter of a wavelength. In the case of a laser wavelength of 10.6 $\mu$m and a direction of incidence of the laser beam of 45 degrees onto the surface of this polarizer 3, this corresponds to a thickness of 1.06 $\mu$m for the material of a refractive index of 2.4 and 1.56 $\mu$m for the material of a refractive index of 1.5. With such a layer structure, the s-component of the polarized radiation is then reflected to the extent of approximately 99.8%, while the p-component of this radiation can pass through approximately to the extent of the same percentage rate. At the position of the polarizing arrangement, the laser radiation emerging from the laser comprise almost exclusively an s-component with respect to the plane of incidence of the polarizer 3, as a consequence of its spatial arrangement. Accordingly, this radiation is almost totally reflected and is directed to the phase shifting device 25. Here, the laser radiation impinges upon a first deflecting mirror 32, which is disposed in space so that the direction of polarization of the laser beam 4 exhibits equally large p- and s-components with respect to the now existing plane of incidence of the beam. This first deflecting mirror 32 is however otherwise of such a nature that no relative temporal delay between the p- and s-waves comes about. The same applies to the other two deflecting mirrors 32 which are provided in the phase shifting device 25. These deflecting mirrors 32 exhibit a high reflectivity as has been explained in connection with the polarizer 3. In this case also, the high reflectivity and the zero shift between the p- and s-components of the laser radiation are achieved using dielectric thin layers in a multiple arrangement and of precisely defined thickness.

With respect to the thickness of the multiple dielectric layers, the deflecting mirror 33 is designed so that a relative phase shift between the p- and s-components of the laser beam 4 occurs in the magnitude of 90 degrees, by a quarter wavelength. The number of layers is invariably selected to be of such magnitude that as a result of the superposition of the reflected and transmitted waves, respectively, which is caused by the individual layers, a high total reflectivity is achieved. In the case of both deflecting mirrors 32 and 33, it is possible to select a metallic layer in particular as the last reflecting surface. This is also the case if the mirror base body consists of metal, which has, moreover, the advantage of an intensive heat removal.

The laser beam 4 emerges from the phase shifting device 25 as a circularly polarized beam and then impinges via the optical focusing system 7 upon the template to be etched. As already stated, this template comprises a thin lacquer layer 8$a$ and a thin-walled metal cylinder 8 situated therebelow. The lacquer layer 8$a$ is vaporized by the laser beam 4, with radiant energy being consumed. Since, however, in order to have a reliable erosion of the lacquer layer 8$a$, more radiant. energy must be made available than is absolutely necessary for the erosion, a portion of the laser radiation will strike the metallic surface and be sent back again for the most part by the latter, in consequence of its high reflectivity. To the extent that this radiation is scattered by small unevennesses so that it no longer coincides colinearly with the original beam direction, this is without significance for a perfect execution of the process. However, those beam components which precisely coincide with the original beam direction again pass through the phase shifting device 25. It has to be stated that the radiation reflected precisely perpendicularly from a metal surface has suffered no phase shift whatsoever between the original p- and s-components. This means that the original 90-degree phase shift is preserved even in the case of the return of the residual radiation to the deflecting mirror 32 in the phase shifting device 25. In this case, once again a phase shift in the same temporal direction and magnitude, i.e. by 90 degrees, is now compelled by the deflecting mirror 33. The laser radiation which now returns exhibits a phase shift of a total of 180 degrees between the p- and s-components. This means that the radiation is again linearly polarized and the plane of polarization has experienced a rotation of 90 degrees relative to its original position. The returning beam leaving the phase shifting device 25 is now perpendicular to the plane of polarization of the radiation originally emitted by the laser. For this reason, the returning radiation is a p-wave with respect to the plane of incidence of the thin-layer polarizer 3. In this case, the p-wave is not reflected, but is transmitted by the thin-layer polarizer 3. It then impinges upon a cooled beam collector 29 which absorbs the radiant energy and converts the same into exhaust heat. Expediently, the beam collector 29 is equipped as far as possible with a nonreflecting or black surface and is cooled for example by water.

Figure 4:
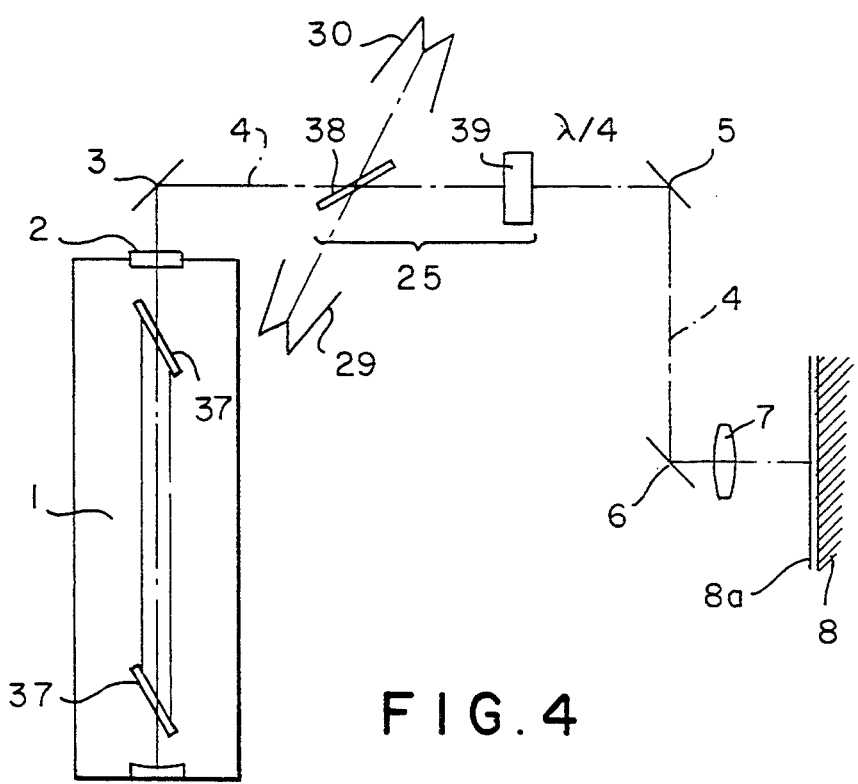
FIG. 4 shows the device with a phase shifting device according to a second exemplary embodiment.

FIG. 4 shows a further embodiment of the device for decoupling backscattered radiation. Components identical to those in FIG. 3 are provided with the same reference symbols. The polarization of the laser radiation 4 takes place in this case by means of two Brewster windows 37 in the interior of the resonator of the laser 1. After emergence of the laser radiation from the laser 1 through the exit opening 2, the laser beam 4 is guided via a first deflecting mirror 3, which causes no phase shift between the components of the linearly polarized radiation, and is further passed through a plane dielectric plate 38, set at the Brewster angle, with a high refractive index. The laser beam 4 then passes through a birefringent small crystal plate 39 which causes a relative phase shift of 90 degrees, i.e. of a quarter of the wavelength, between two equally large components which are at right angles to one another. These are the components of the ordinary and of the extraordinary beam. These may be selected to be equally large where the crystal exhibits the correct rotational position in relation to the direction of polarization of the laser beam 4. The relative shift of the two beam components is then only dependent upon the length of the optical path through the crystal 39 and the nature of the crystal, and accordingly the length of the crystal 39 is selected to be of such magnitude that the desired phase shift comes about. The laser beam 4 is circularly polarized after the first passage through the crystal 39 and is again linearly polarized after the second passage through the latter or, preferably, after the return, in consequence of the then effected second, equally large and similarly directed shift. The direction of polarization is then perpendicular to the direction of polarization in the course of the first passage.

As the laser beam 4 progresses, it again impinges upon the plane dielectric plate 38, which is set at the Brewster angle and which now substantially reflects the returning radiation, in consequence of its different direction of polarization, into the beam collector 39. Only small components of the radiation pass into the laser resonator, where, because of the further two Brewster windows 37 and because of their direction of polarization, they cannot trigger any laser activity. In order to increase the reflectivity of the plane plate 38, the latter can be coated with a thin layer or with a plurality of thin layers.

It should also be pointed out that, in place of the thin film polarizer 3 or the Brewster window 38 employed for the polarization, it is possible to use a dichroic polarizer of, in the case of relatively long-wavelength laser radiation, a wire-grid polarizer. It is also possible to use a Fresnel rhombus, also referred to as a Fresnel parallelepiped, as the phase shifting device 25.

What is claimed is:

1. Apparatus for etching a round template such as a hollow cylindrical metal screen having a thin lacquer layer on the outer surface thereof, comprising
   (a) means for rotating the metal screen about a longitudinal axis;
   (b) laser means for generating a linear polarized laser beam;
   (c) a first deflector mirror movable parallel to said axis for deflecting said laser beam onto the surface of the screen to erode predetermined pattern regions of the lacquer layer, said laser means being continuously energized during erosion of the pattern region and deenergized at the end of each pattern region within a time interval of 12 $\mu s$ to 30 $\mu s$;
   (d) means arranged between said laser means and said first deflector mirror for rotating the plane of oscillation of radiation reflected from the metal screen by 90 degrees with respect to the plane of the laser beam for decoupling the reflected radiation from the laser beam path.

2. Apparatus as defined in claim 1, wherein said laser beam from said laser means is arranged parallel to the axis of the metal screen, and further comprising a second deflector mirror arranged between said laser means and said plane rotating means and a third deflector mirror arranged between said plane rotating means and said first deflector mirror.

3. Apparatus as defined in claim 2, wherein said second deflector mirror comprises a thin-layer polarizer and said plane rotating means comprises four additional deflecting mirrors arranged in succession in the laser beam path, one of said additional deflecting mirrors comprising a $\lambda/4$ phase shifter.

4. Apparatus as defined in claim 3, wherein said plane rotating means further comprises a plane dielectric plate of high refractive index set at a Brewster angle and a birefringent small crystal plate arranged in succession in the laser beam path.

5. Apparatus as defined in claim 4, and further comprising a cross beam for supporting said plane rotating means between said second and third deflector means.

6. Apparatus as defined in claim 1, and further comprising a control device for controlling said rotating means and for controlling movement of said first deflector mirror, said control device including setting means for controlling the gas composition of said laser means.

* * * * *